United States Patent
Hauser et al.

(12)

(10) Patent No.: US 6,322,907 B1
(45) Date of Patent: Nov. 27, 2001

(54) COMPOSITE WIRE COMPRISING A CARBON-STEEL CORE AND A STAINLESS-STEEL OUTER LAYER

(75) Inventors: Jean-Michel Hauser, Ugine; Marc Francois, Metz, both of (FR)

(73) Assignees: Aster, Puteaux; Ugine-Savoie Imphy, Ugine, both of (FR)

( * ) Notice: Subject to any disclaimer, the term of this patent is extended or adjusted under 35 U.S.C. 154(b) by 0 days.

(21) Appl. No.: 09/362,684

(22) Filed: Jul. 29, 1999

(51) Int. Cl.[7] ............................. B32B 15/02; B21C 1/00; B21F 19/00
(52) U.S. Cl. .................. 428/683; 428/685; 428/625; 428/375; 428/379; 428/389
(58) Field of Search ..................... 428/625, 364, 428/375, 379, 381, 389, 615, 668, 681, 682, 683, 684, 685

(56) References Cited

U.S. PATENT DOCUMENTS

| 4,917,969 | 4/1990 | Pircher et al. . |
| 5,366,569 | 11/1994 | Mueller et al. . |
| 5,772,105 | * 6/1998 | Zadno-Azizi et al. . |
| 5,837,326 | * 11/1998 | Dallaire et al. . |

FOREIGN PATENT DOCUMENTS

| 0 059 070 | 9/1982 | (EP) . |
| 0 225 983 | 6/1987 | (EP) . |
| 0 851 039 | 7/1988 | (EP) . |
| 0 546 549 | 6/1993 | (EP) . |
| 0 761 426 | 3/1997 | (EP) . |
| 1 305 419 | 1/1973 | (GB) . |
| 61-255781 | 11/1986 | (JP) . |

OTHER PUBLICATIONS

Patent Abstracts of Japan; Murai Teruyuki; vol. 006, No. 039; Mar. 10, 1982; (w/ Copy of Japanese Language Abstract 56 154239; Nov. 28, 1981).
Patent Abstracts of Japan; Noma Tetsuo; vol. 016, No. 507; Oct. 20, 1992; (w/copy of Japanese Language Abstract 04 187336; Jul. 6, 1992).
Patent Abstracts of Japan; Murai Teruyuki; vol. 006, No. 035; Mar. 3, 1982; (w/copy of Japanese Language Abstract 56 152922; Nov. 26, 1981).
Patent Abstracts of Japan; Murai Teruyuki; vol. 006; No. 033; Feb. 27, 1982; (w/ copy of Japanese Language Abstract 56 148410; Nov. 17, 1981).
Patent Abstracts of Japan; Shimizu Sumio; vol. 011, No. 111; Apr. 8, 1987 & JP 61 255781; Nov. 13, 1986.

* cited by examiner

*Primary Examiner*—Deborah Jones
*Assistant Examiner*—Jason Savage
(74) *Attorney, Agent, or Firm*—Oblon, Spivak, McClelland, Maier & Neustadt, P.C.

(57) ABSTRACT

Composite wire comprising a core made of carbon steel the chemical composition of which consists, by weight, of: $0.15\% \leq C \leq 0.6\%$; $0.1\% \leq Si \leq 0.3\%$; $0.3\% \leq Mn \leq 1\%$; $0\% V \leq 0.3\%$; the remainder being iron and impurities resulting from processing; and an outer layer made of stainless steel the composition of which consists, by weight, of $0.005\% \leq C \leq 0.05\%$; $0.005\% \leq N \leq 0.05\%$; $0.1\% \leq Si \leq 2\%$; $0.1\% \leq Mn \leq 5\%$; $5\% \leq Ni \leq 12\%$; $10\% \leq Cr \leq 20\%$; $0\% \leq Mo \leq 3\%$; $0\% \leq Cu \leq 4\%$; the remainder being iron and impurities resulting from processing. The diameter of the wire is less than 1 mm and the tensile strength of the wire is in excess of 2000 MPa.

12 Claims, No Drawings

COMPOSITE WIRE COMPRISING A CARBON-STEEL CORE AND A STAINLESS-STEEL OUTER LAYER

BACKGROUND OF THE INVENTION

1. Field of the Invention

The invention relates to a composite wire, preferably of small diameter and high mechanical resistance, comprising a carbon-steel core and a stainless-steel outer layer.

2. Discussion of the Background

Fine wires, with diameter less than I mm, having a tensile strength in excess of 2000 MPa, used to manufacture, for example, guy wires, cables for the reinforcement of conveyor belts or pipes under pressure, elastomer reinforcement wires or cables, in general are obtained by fine wiredrawing of a machine wire made of high-carbon steel containing approximately 0.8% carbon, 0.5% manganese, 0.3% silicon, the remainder being essentially iron. These wires have the disadvantage of being sensitive to corrosion, which leads to risks of premature breaking in service. This problem of corrosion resistance also exists for wires of greater diameter, and it has been proposed to remedy it by using composite wires comprising a core made of high-carbon steel identical to that which has just been described, and a thin outer layer made of austenitic stainless steel of the SUS 304 type containing 17% to 19% chromium, 9% to 11% nickel, approximately 0.1% carbon, the remainder being iron and impurities resulting from processing. This is the case, in particular, in Japanese patent applications JP 56 148410 and JP 56 152922. But the solutions proposed by these patent applications do not make it possible to obtain diameters less than 1 mm and tensile strengths in excess of 2000 MPa. These limits result, in particular, from the formation of chromium carbides at the interface between the high-carbon steel and the stainless steel at the time of the thermal treatments required for wiredrawing.

In order to limit the detrimental effect of the chromium carbides at the interface between the high-carbon steel and the stainless steel, it has been proposed, in Japanese patent application JP 41 87336, to intercalate a fine layer of copper between the high-carbon steel and the stainless steel. There thus may be obtained a wire with a diameter of 0.7 mm, the tensile strength of which is 2000 MPa. But, with this technique, it is not possible to obtain a lesser diameter and a higher resistance; in addition, this technique requires the depositing of a layer of copper on the high-carbon steel core, which complicates manufacturing.

SUMMARY OF THE INVENTION

One object of this invention is to remedy these drawbacks and to provide a wire with a diameter less than 1 mm and a tensile strength higher than 2000 Mpa, having a good resistance to corrosion.

To this end, the invention provides a composite wire comprising a carbon-steel core and a stainless-steel outer layer. This wire is preferably such that:

the chemical composition of the carbon steel comprises, consists essentially of, or consists of, by weight:
$0.15\% \leq C \leq 0.6\%$
$0.1\% \leq Si \leq 0.3\%$
$0.3\% \leq Mn \leq 1\%$
$0\% \leq V \leq 0.3\%$ the remainder comprising, consisting of, or consisting essentially of iron and impurities resulting from processing, the chemical composition of the stainless steel comprises, consists essentially of, or consists of, by weight:

$0.005\% \leq C \leq 0.05\%$
$0.005\% \leq N \leq 0.05\%$
$0.1\% \leq Si \leq 2\%$
$0.1\% \leq Mn \leq 5\%$
$5\% \leq Ni \leq 12\%$
$10\% \leq Cr \leq 20\%$
$0\% \leq Mo \leq 3\%$
$0\% \leq Cu \leq 4\%$ the remainder comprising, consisting essentially of, or consisting of iron and impurities resulting from processing, the diameter of the wire is less than 1 mm and the tensile strength of the wire is higher than 2000 MPa.

The chemical composition of the carbon steel preferably is such that:
$S \leq 0.02\%$
$P \leq 0.02\%$
$Al \leq 0.005\%$
$N \leq 0.008\%$ The ratio of the stainless-steel wire section to the total wire section preferably ranges between 5% and 20%.

The chemical composition of the carbon steel may be chosen such that:
$0.15\% \leq C \leq 0.35\%$
$0.5\% \leq Mn \leq 1\%$
and that of the stainless steel such that:
$9\% \leq Ni \leq 12\%$
$15\% \leq Cr \leq 20\%$
$1.5\% \leq Cu < 4\%$ this composition furthermore satisfying the relationship:

$$-150 \leq 551 - 462 \times (C+N) - 9.2 \times Si - 20 \times Mn - 13.7 \times Cr - 29 \times (Ni+Cu) - 18.5 \times Mo < -55$$

In this case, there may be obtained a wire the diameter of which ranges between 0.1 mm and 0.8 mm. and the tensile strength of which ranges between 2100 MPa and 2700 MPa. Wiredrawing then may be performed without intermediate thermal treatment.

The chemical composition of the carbon steel also may be such that:
$0.35\% \leq C \leq 0.6\%$
$0.3\% \leq Mn < 0.6\%$
and the chemical composition of the stainless steel such that:

$$-55 \leq 551 - 462 \times (C+N) - 9.2 \times Si - 20 \times Mn - 13.7 \times Cr - 29 \times (Ni+Cu) - 18.5 \times Mo \leq -30$$

The chemical composition of the stainless steel preferably should be such that:
$C+N \leq 0.06\%$ Also preferably, the copper content of the stainless steel should range between 3% and 4%.

There then may be obtained a wire the diameter of which ranges between 0.1 mm and 0.8 mm and the tensile strength of which ranges between 2700 MPa and 3400 MPa. Wiredrawing for this wire requires an intermediate thermal treatment which:

when the carbon content ranges between 0.35% and 0.45%, may be a hardening by cooling at a rate in excess of 100° C./s after austenitizing between 950° C and 1050° C. for about 5 s, followed by a tempering between 550° C. and 650° C. for about 5 s, when the carbon content ranges between 0.45% and 0.6%, may be either a patenting between 550° C. and 6000° C., or an ongoing cooling to ambient temperature at a rate in excess of 200° C./s after an austenitizing between 950° C. and 1050° C. for about 5 s.

The wire according to the invention may be used in particular for the reinforcement of elastomers.

The invention now is going to be described in greater detail and illustrated by examples.

In order to manufacture a composite wire according to the invention, one starts with a machine wire with a diameter equal, for example, to 5.5 mm, or a drawn wire of smaller diameter, for example 3 nmm, made of carbon steel obtained by hot-rolling of a billet. The wire is pickled, then coated, over its entire surface, with a layer of stainless steel with a thickness of about a few tenths of a millimeter (preferably between 0.1 and 0.3 mm), so as to obtain a rough form for composite wire. The thickness of the stainless-steel layer is determined so that the proportion of the rough-form section, and thus of the composite wire, which is composed of stainless steel, ranges between 5% and 20%, and preferably less than 10%, of the total rough-form or composite-wire section.

Coating of the machine wire may be accomplished by various processes, for example by co-rolling of a stainless-steel tube and a carbon-steel wire inserted into the tube. The carbon-steel wire also may be coated with a layer of stainless steel by causing it to pass through a bath of stainless steel, or even performing the coating by overlaying of a strip on the surface of the machine wire, or by any other process known to the individual skilled in the trade.

The rough form thus obtained then is wiredrawn with or without thermal treatment in the course of the wiredrawing.

Generally speaking, the carbon steel used contains, by weight, from 0.15% to 0.6% carbon, from 0.1% to 0.3% silicon, from 0.3 to 1% manganese, possibly up to 0.3% vanadium, the remainder being iron and impurities resulting from processing.

The carbon content is chosen on the one hand so as to make it possible to obtain the desired tensile strength, ranging between 2000 Mpa and 3400 MPa, on the other so as to avoid bringing too much carbon into the proximity of the interface between the carbon steel and the stainless steel. Silicon is a residue of deoxidation of the steel and the content thereof should not be too high so as not to reduce the ductility too much.

Manganese imparts a certain hardening capacity, necessary for obtaining a very high tensile strength.

Vanadium may be added to increase the final mechanical resistance of the fine drawn wire.

The impurities resulting from processing include in particular sulfur, the content of which preferably should be less than 0.02%, phosphorus the content of which preferably should be less than 0.02%, aluminum the content of which preferably should be less than 0.005%, and nitrogen the content of which preferably should be less than 0.008%. These limits are desirable in order to make a fine wiredrawing possible.

Also generally speaking, the stainless steel is an austenitic stainless steel the structure of which is capable of being converted into martensite after wiredrawing and which contains little carbon in order to limit the risks of precipitation of chromium carbides at the interface between the stainless steel and the carbon steel. This steel contains, by weight:

from 0.005% to 0.05% carbon and from 0.005% to 0.05% nitrogen, so as to make it possible to obtain a predominantly martensitic structure after wiredrawing, while limiting the risks of precipitation of chromium carbides at the interface between the stainless steel and the carbon steel;

from 0% (in general more than 0.1%) to 2% silicon; this element required for deoxidation should not be in too great a quantity in order to avoid weakening the metal in the work-hardened state;

from 0.1% to 5% manganese; this element, required for the control of inclusions with the further advantage of promoting the obtaining of an austenitic structure, should not be in too great a quantity in order to avoid processing difficulties, from 5% to 12% nickel in order to impart to the steel an austenitic structure capable of converting into martensite in the course of wiredrawing, from 10% to 20% chromium in order to obtain an adequate stainless quality, possibly from 0% to 3% molybdenum in order to improve corrosion resistance, possibly from 0% to 4% copper in order to improve the capacity of the steel for cold deforming; nonetheless, when it is in too great a quantity, this element generates difficulties in hot deforming, the remainder being iron and impurities resulting from processing such as sulfur, phosphorus, oxygen and aluminum, or elements added in very small quantities in order to control inclusions.

The sulfur content preferably is less than 0.03% and the phosphorus content is less than 0.1%.

These compositions, for carbon steel as well as for stainless steel, make it possible to obtain a composite wire with a diameter less than 1 mm, and which may reach 0.1 mm, and with tensile strength in excess of 2000 MPa, and which may reach 3400 MPa; this wire having a good corrosion resistance and a good fatigue strength, in particular because there are practically no chromium-carbide precipitates at the interface between the carbon steel and the stainless steel.

Nonetheless, the chemical compositions of the steels should be chosen in terms of the range of tensile strength which one wishes to obtain.

When the tensile strength sought ranges between 2100 MPa and 2700 MPa for a diameter ranging between 0.2 mm and 0.8 mm, the chemical composition of the carbon steel is such that:

$0.15\% \leq C \leq 0.35\%$ $0.5\% \leq Mn \leq 1\%$

This steel makes it possible both to perform a sufficiently deep wiredrawing, that is, with a rate of reduction in excess of 95%, and to obtain the desired mechanical characteristics without its being necessary to carry out thermal treatment in the course of the wiredrawing. But, in order that the manufacture of the composite wire may be performed without intermediate thermal treatment, the stainless steel also must be able to be wiredrawn without thermal treatment and make it possible to obtain sufficient mechanical characteristics. Accordingly, the composition of the stainless steel is chosen such that:

$9\% \leq Ni \leq 12\%$ $10\% \leq Cr \leq 20\%$ $1.5\% \leq Cu \leq 4\%$ this composition furthermore satisfying the relationship:

$$-150 \leq 551 - 462 \times (C+N) - 9.2 \times Si - 20 \times Mn - 13.7 \times Cr - 29 \times (Ni+Cu) - 18.5 \times Mo < -55$$

When the sought tensile strength ranges between 2700 MPa and 3400 MPA, it is necessary to perform a thermal treatment in the course of the wiredrawing, and the chemical composition of the carbon steel is such that:

$0.35\% \leq C \leq 0.6\%$ $0.3\% \leq Mn \leq 0.6\%$

The thermal treatment which is carried during the process depends on the carbon content of the carbon steel.

when the carbon content ranges between 0.35% and 0.45%, a hardening by cooling at a rate in excess of 130° C./s after austenitizing between 950° C. and 1050° C. for about 5 s; that is, between 2 s and 10 s, followed by a tempering between 550° C. and 650° C. for about 5 s; that is, between 2 s and 10 s;

when the carbon content ranges between 0.45% and 0.6%, either a patenting between 550° C. and 600° C., or an ongoing cooling to ambient temperature at a rate in excess of 20° C./s after an austenitization between 950° C. ands 1050° C. for about 5 s; that is, between 2 and 10 s.

In this case, the stainless steel is chosen in order to be compatible with the thermal treatment. Its chemical composition then is such that:

$5\% \leq Ni \leq 12\%$ $10\% \leq Cr \leq 20\%$ preferably, the sum C+N should be less than 0.06% and the copper content should range between 3% and 4%. In addition, the analysis should satisfy the relationship:

$-55 \leq 551 - 462 \times (C+N) - 9.2 \times Si - 20 \times Mn - 13.7 \times Cr - 29 \times (Ni+Cu) - 18.5 \times Mo \leq -30$ By way of a first example, a composite wire was made by dip-coating a wiredrawn carbon-steel wire 3.2 mm in diameter with a stainless steel layer of 0.1 mm, or 6% of the section.

The chemical composition of the carbon steel was:

| C | Mn | P | S | Si | Al | N | V |
|---|---|---|---|---|---|---|---|
| 0.442 | 0.585 | 0.005 | 0.01 | 0.222 | 0.004 | 0.0045 | 0.15 |

The chemical composition of the stainless steel was:

| C | Mn | P | S | Si | Al | N | Ni | Cr | Mo | Cu |
|---|---|---|---|---|---|---|---|---|---|---|
| 0.023 | 1.5 | 0.015 | 0.005 | 0.244 | 0.004 | 0.034 | 9.93 | 18.2 | 0.18 | 0.05 |

With this analysis, one has:

$551 - 462 \times (C+N) - 9.2 \times Si - 20 \times Mn - 13.7 \times Cr - 29 \times (Ni+Cu) - 18.5 \times Mo = -49.5$ The wire thus coated with stainless steel first is wiredrawn to the diameter of 1.3 mm, or a rate of reduction of 85%. It then is subjected to a thermal treatment of hardening and tempering consisting in an austenitizing at 1050° C. for 5 seconds, followed by a cooling at the rate of 200° C./s to ambient temperature, then a tempering at 600° C. for 5 seconds.

The wiredrawing then is continued to the final diameter of 0.20 mm. The composite wire comprising an outer layer of stainless of 6 μm in thickness, or 6% of the section, has a tensile strength of 2850 MPa.

By way of a second example, a composite wire was made by dip-coating a carbon-steel machine wire 5.5 mm in diameter with a layer of stainless steel of 0.22 mm, or 14% of the section.

The chemical composition of the carbon steel was:

| C | Mn | P | S | Si | Al | N |
|---|---|---|---|---|---|---|
| 0.197 | 0.7 | 0.007 | 0.01 | 0.25 | 0.002 | 0.0037 |

The chemical composition of the stainless steel was:

| C | Mn | P | S | Si | Al | N | Ni | Cr | Mo | Cu |
|---|---|---|---|---|---|---|---|---|---|---|
| 0.011 | 0.376 | 0.021 | 0.002 | 0.299 | 0.002 | 0.034 | 9.49 | 17.45 | 0.175 | 3.08 |

With this analysis, one has:

$551 - 462 \times (C+N) - 9.2 \times Si - 20 \times Mn - 13.7 \times Cr - 29 \times (Ni+Cu) - 18.5 \times Mo = -86.9$ The wire thus coated with stainless steel was wiredrawn without intermediate thermal treatment to the diameter of 0.34 mm, or a total rational deforming of E=5.7.

The fine composite wire obtained comprises an external layer of stainless steel of 13 μm in thickness, or 14% of the section, and has a tensile strength of 2368 Mpa.

French patent application 98 09739 filed Jul. 30, 1998, is incorporated herein by reference.

What is claimed is:

1. A composite wire comprising a carbon-steel core and a stainless-steel outer layer, wherein:

the chemical composition of the carbon steel comprises, by weight based on total weight, $0.15\% \leq C \leq 0.6\%$
$0.1\% \leq Si \leq 0.3\%$
$0.3\% \leq Mn \leq 1\%$
$0\% \leq V \leq 0.3\%$ the remainder comprising iron and impurities resulting from processing, the chemical composition of the stainless steel comprises, by weight based on total weight, $0.005\% \leq C \leq 0.05\%$
$0.005\% \leq N \leq 0.05\%$
$0.1\% \leq Si \leq 2\%$
$0.1\% \leq Mn \leq 5\%$
$5\% \leq Ni \leq 12\%$
$10\% \leq Cr \leq 20\%$
$0\% \leq Mo \leq 3\%$
$0\% \leq Cu \leq 4\%$ the remainder comprising iron and impurities resulting from processing, the diameter of the wire is less than 1 mm and the tensile strength of the wire is in excess of 2000 Mpa.

2. The wire according to claim 1, wherein the chemical composition of the carbon steel comprises:
S≦0.02%
P≦0.02%
Al≦0.005%
N≦0.008%.

3. The wire according to claim 1, wherein the ratio of the stainless-steel wire section to the total wire section ranges between 5% and 20%.

4. The wire according to claim 1, wherein:
the chemical composition of the carbon steel comprises:
0.15%≦C≦0.35%
0.5%≦Mn≦1%
and the chemical composition of the stainless steel comprises:
9%≦Ni≦12%
15%≦Cr≦20%
1.5%≦Cu≦4%
the composition of the stainless steel further satisfying the relationship:

$$-150 \leq 551-462 \times (C+N) - 9.2 \times Si - 20 \times Mn - 13.7 \times Cr - 29 \times (Ni+Cu) - 18.5 \times Mo \leq -55.$$

5. The wire according to claim 4, whose diameter ranges between 0.1 and 0.8 mm, and where tensile strength ranges between 2100 MPa and 2700 Mpa.

6. The wire according to claim 1, wherein:
the chemical composition of the carbon steel comprises:
0.35%≦C≦0.6%
0.3%≦Mn≦0.6%
and the chemical composition of the stainless steel is such that:

$$-55 \leq 551-462 \times (C+N) - 9.2 \times Si - 20 \times Mn - 13.7 \times Cr - 29 \times (Ni+Cu) - 18.5 \times Mo \leq 30.$$

7. The wire according to claim 6, wherein the chemical composition of the stainless steel is such that:
C+N≦0.06%.

8. The wire according to claim 6, wherein the stainless steel has a copper content ranging between 3% and 4%.

9. The wire according to claim 6 having a diameter ranging between 0.1 and 0.8 mm and a tensile strength ranging between 2700 MPa and 3400 Mpa.

10. A wiredrawing process wherein the wire according to claim 4 is drawn without an intermediate thermal treatment.

11. A process for the manufacture by wiredrawing of a wire according to claim 6, wherein the wiredrawing comprises an intermediate thermal treatment which is:
when the carbon content ranges between 0.35% and 0.45%, a hardening by cooling at a rate in excess of 100° C./s after austenitizing between 950° C. and 1050° C. for a period ranging between 2 and 10 s, followed by a tempering between 550° C. and 650° C. for a period ranging between 2 and 10 s, or
when the carbon content ranges between 0.45% and 0.6%, either a patenting between 550° C. and 600° C., or an ongoing cooling to ambient temperature at a rate in excess of 20° C./s after an austenitizing between 950° C. and 1050° C. for a period ranging between 2 and 10 s.

12. A reinforced elastomer composition comprising elastomer and the wire of claim 1.

* * * * *

UNITED STATES PATENT AND TRADEMARK OFFICE
CERTIFICATE OF CORRECTION

PATENT NO. : 6,322,907 B1
DATED : November 27, 2001
INVENTOR(S) : Hauser et al.

It is certified that error appears in the above-identified patent and that said Letters Patent is hereby corrected as shown below:

<u>Title page,</u>
Item [30], Foreign Application Priority Data, should read:
-- [30]     Foreign Application Priority Data
  Jul. 30, 1998       (FR) ………………………….. 98 09739 --

Signed and Sealed this

Twenty-fifth Day of June, 2002

Attest:

Attesting Officer

JAMES E. ROGAN
*Director of the United States Patent and Trademark Office*